A. W. HARRIS.
CARTON PACKING MECHANISM.
APPLICATION FILED JAN. 17, 1919.
1,345,926.
Patented July 6, 1920.
13 SHEETS—SHEET 7.
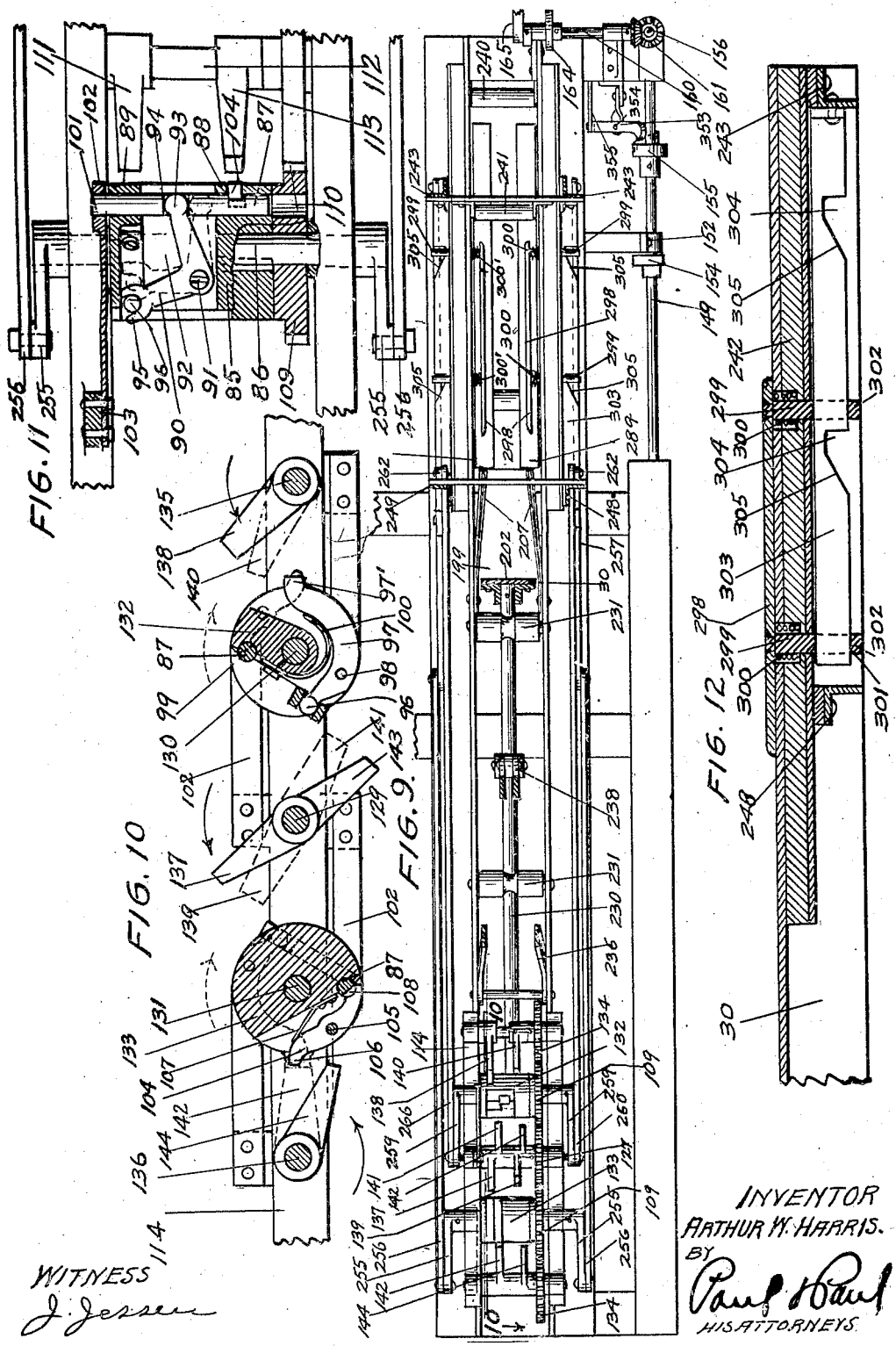
WITNESS
J. Jessen
INVENTOR
ARTHUR W. HARRIS.
BY
Paul & Paul
HIS ATTORNEYS.

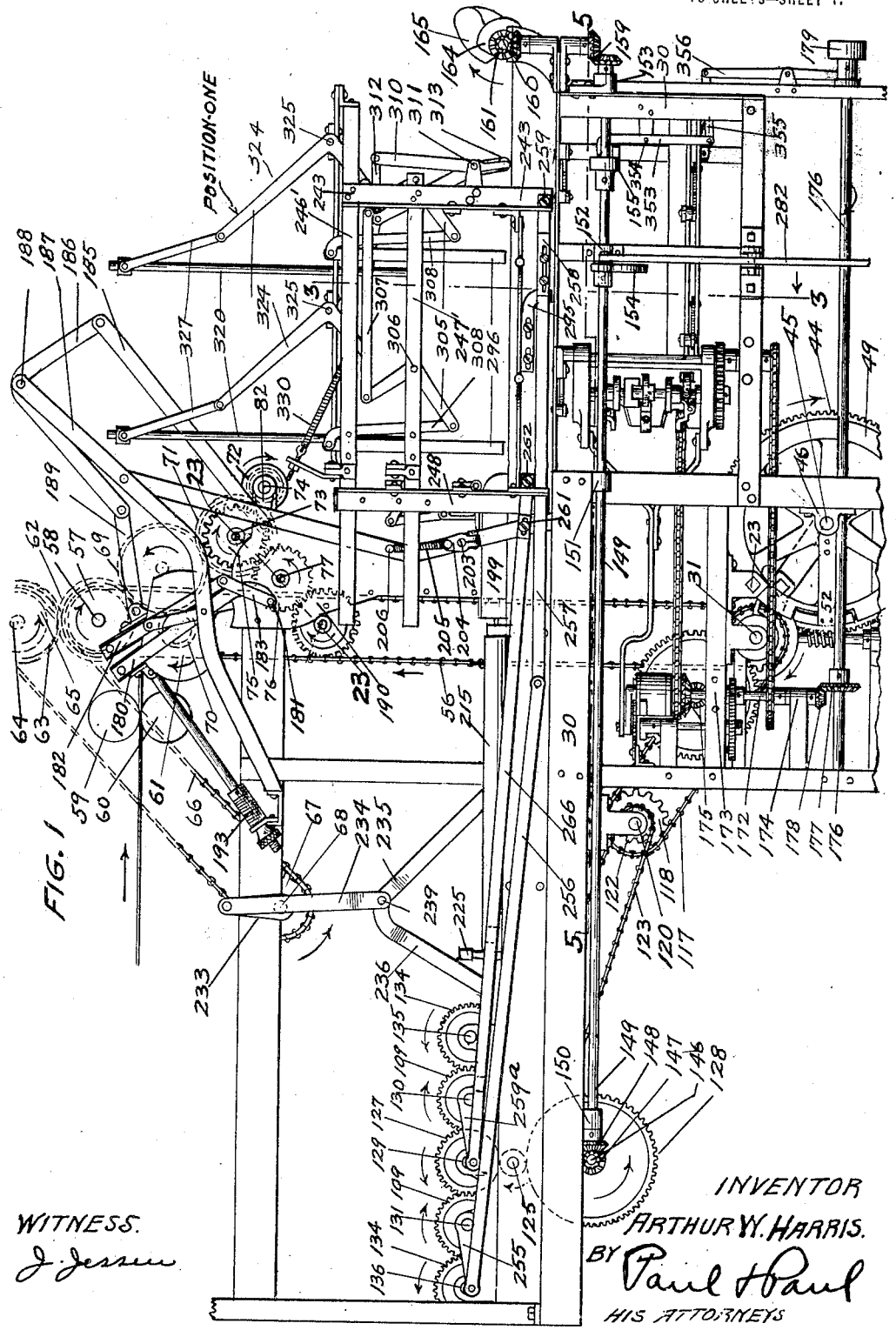

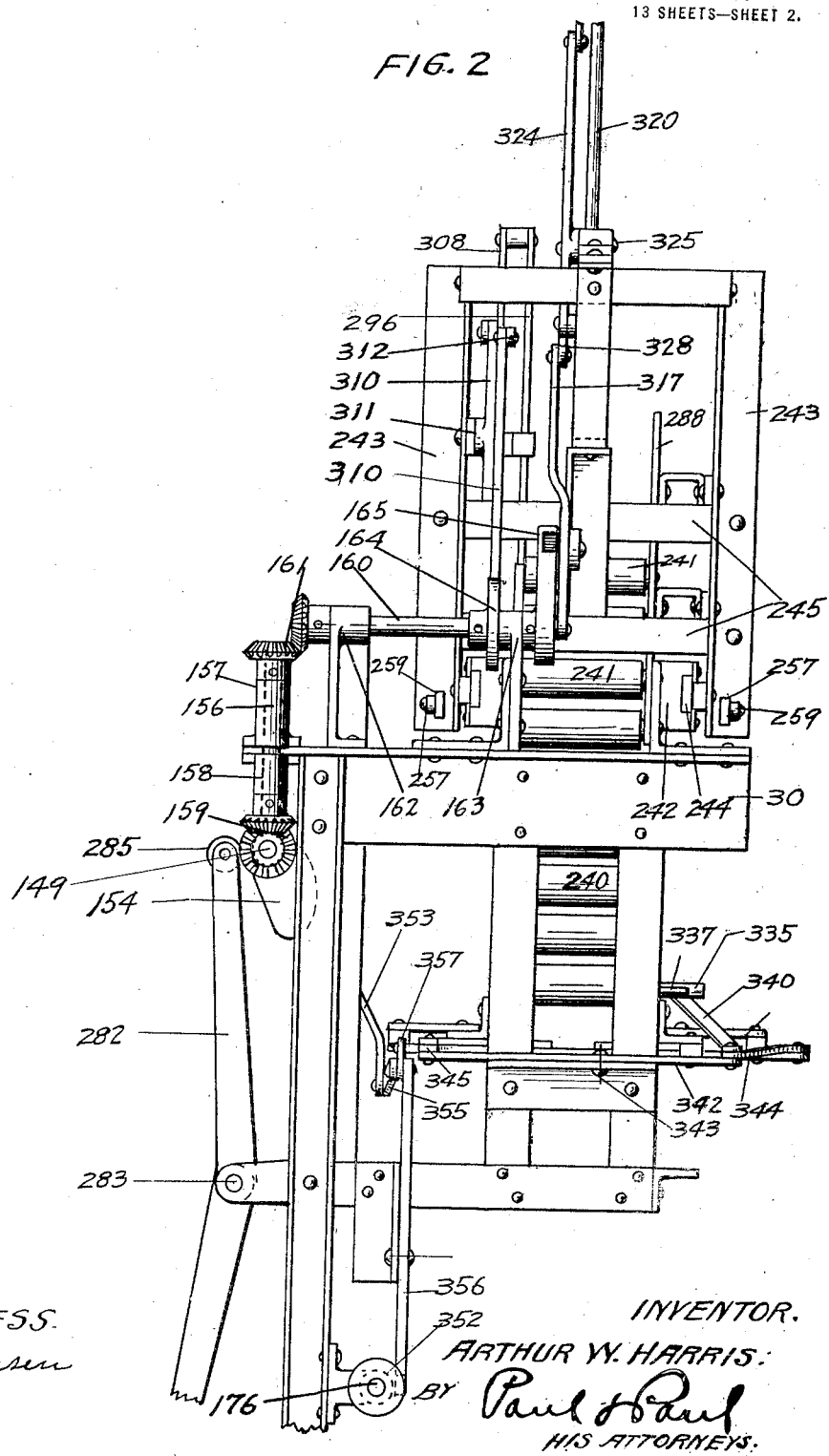

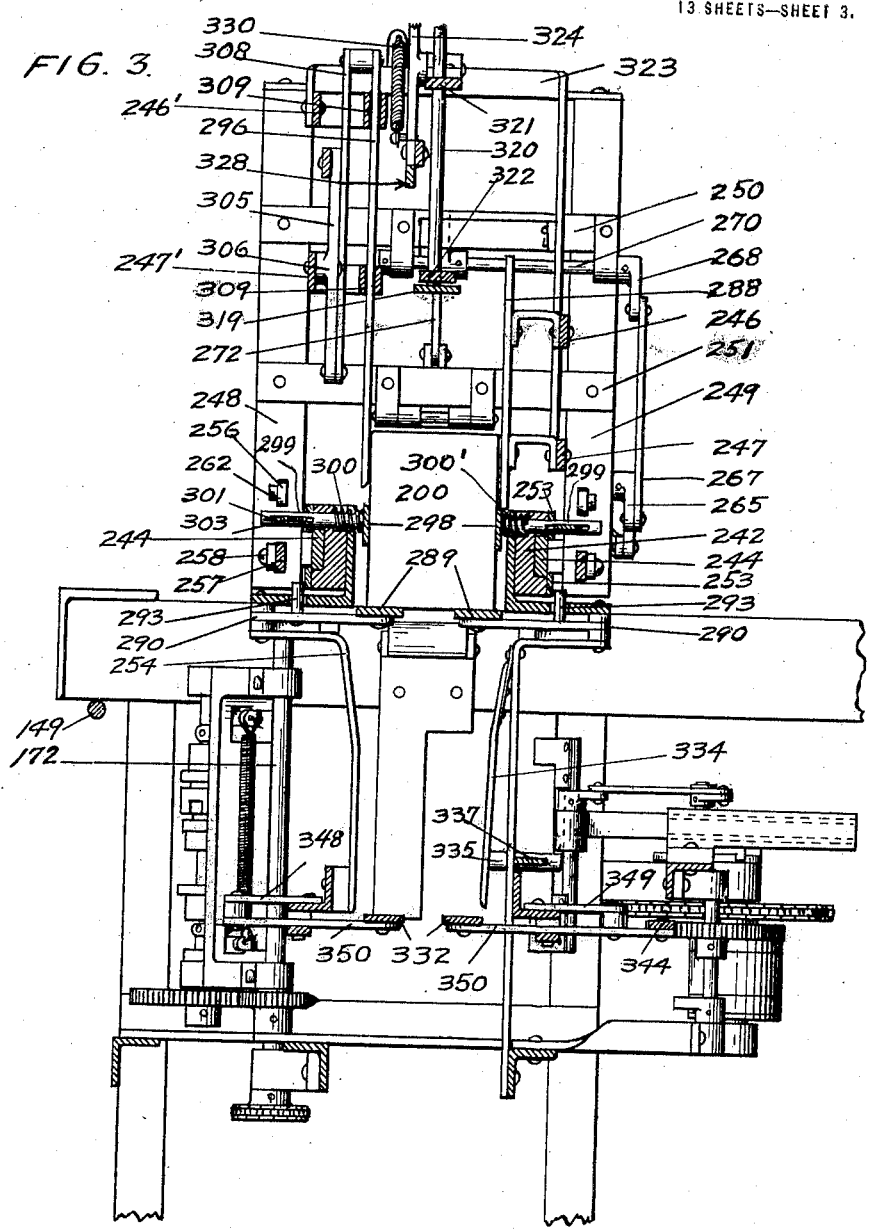

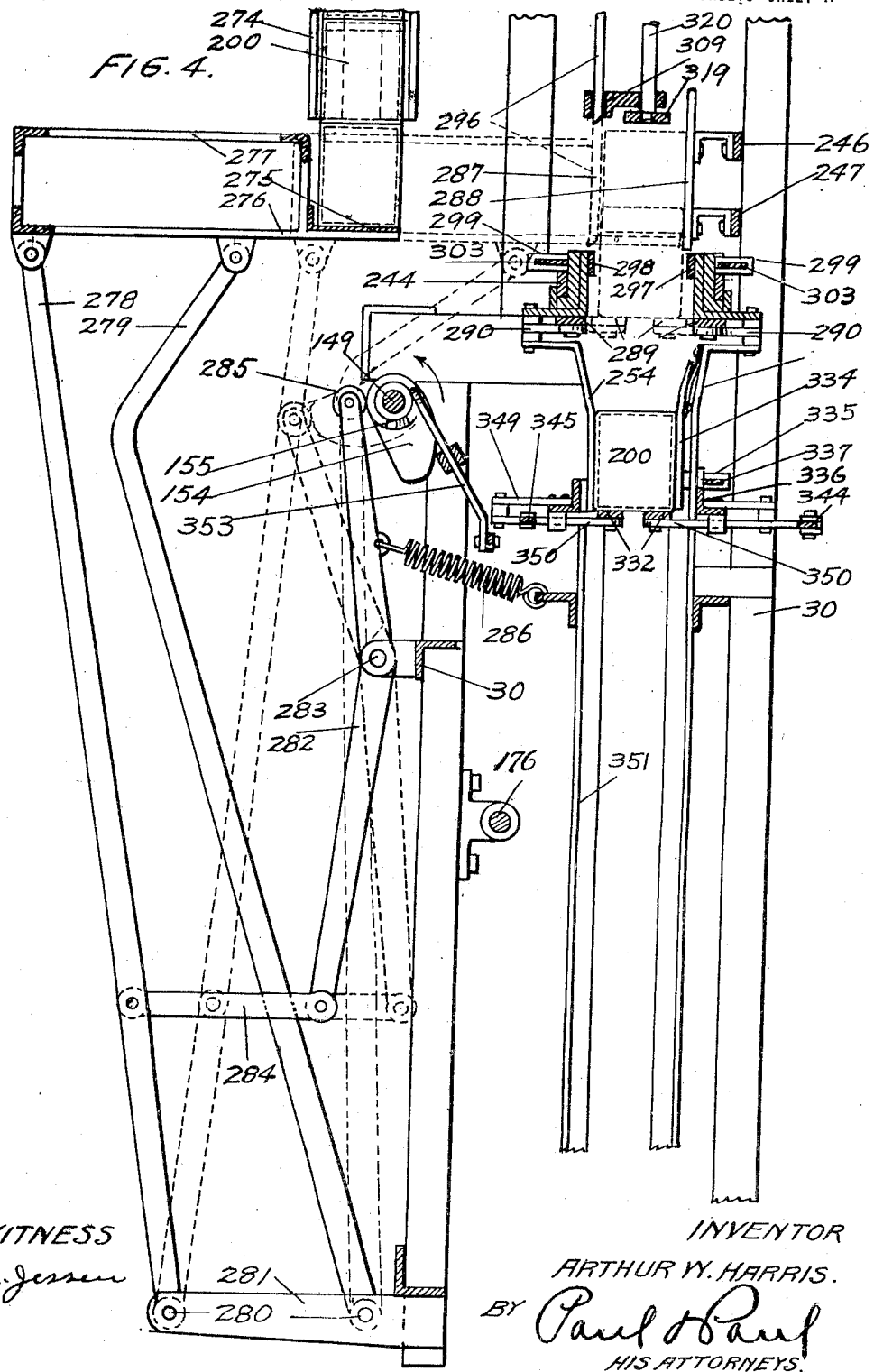

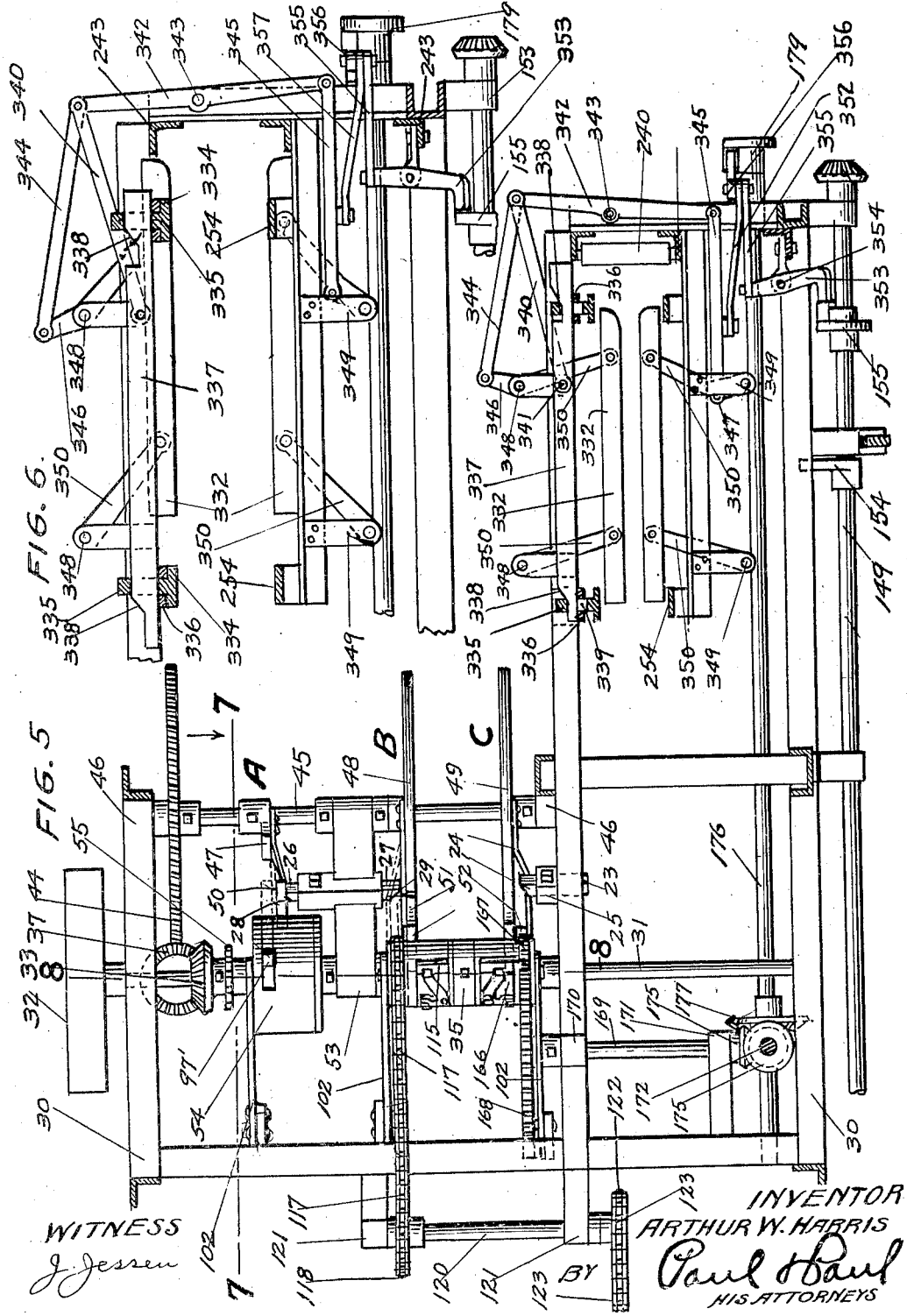

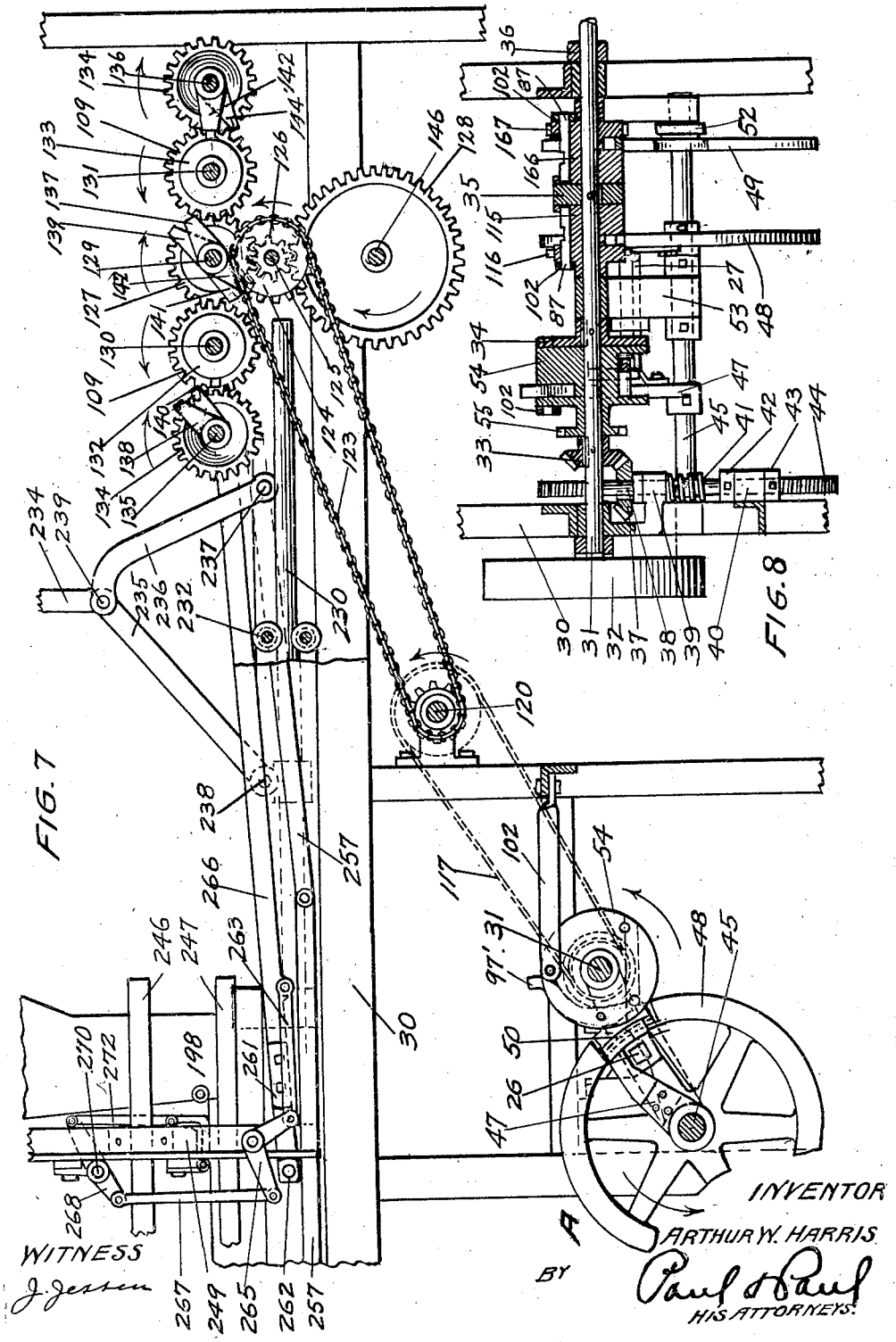

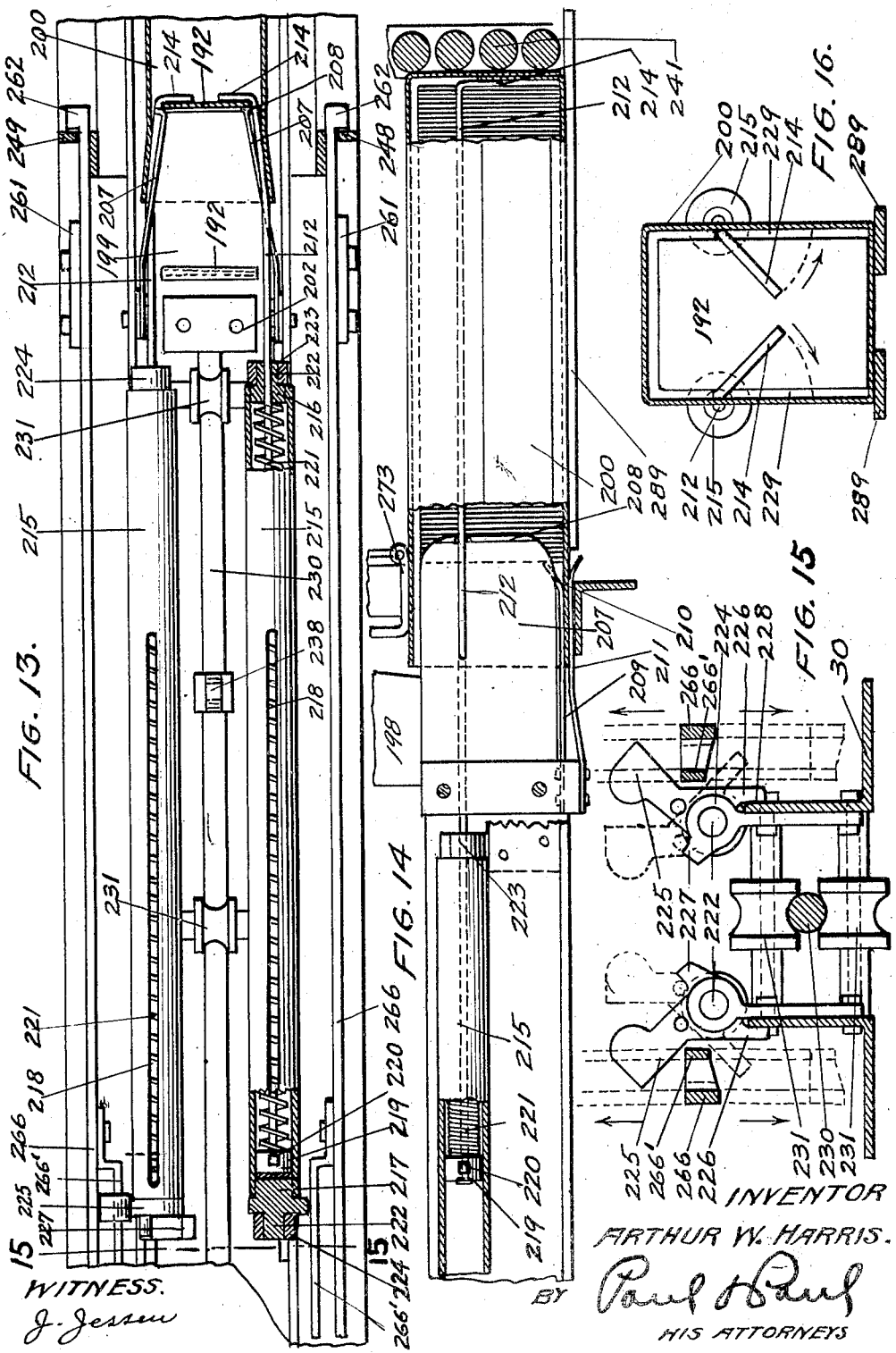

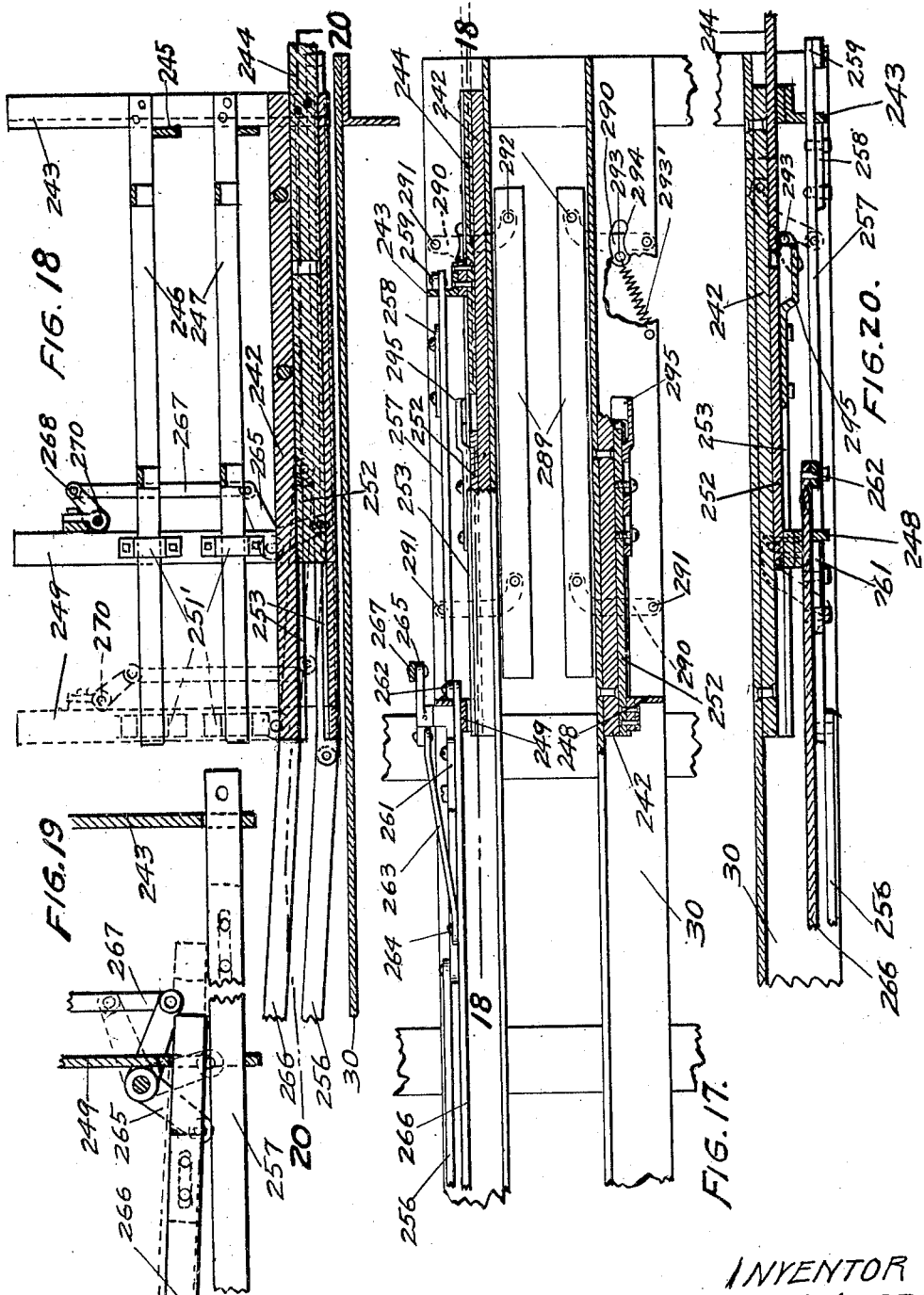

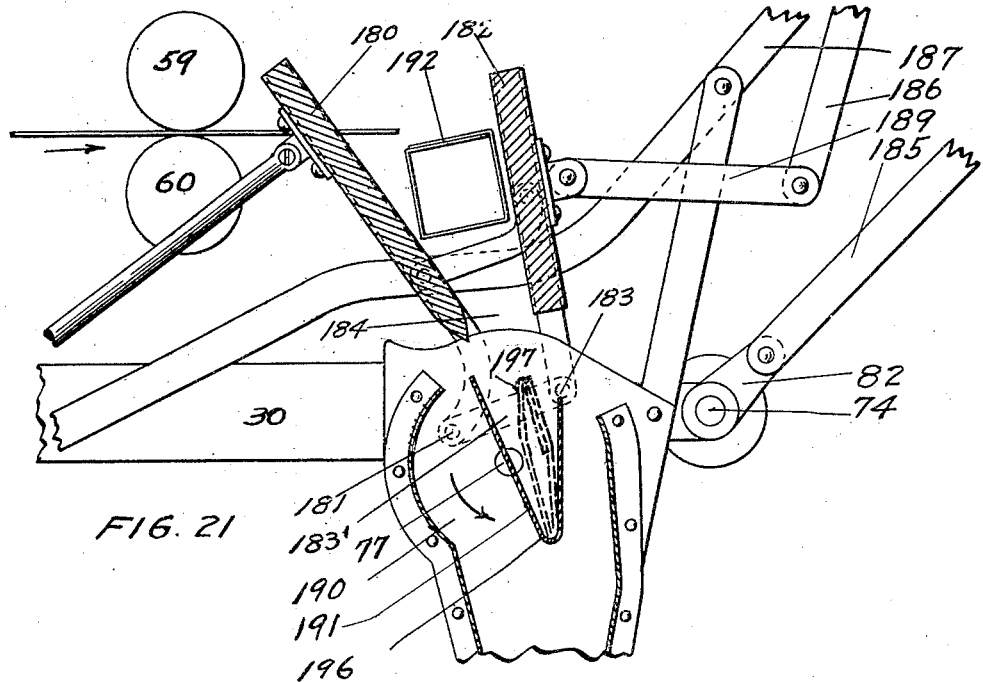

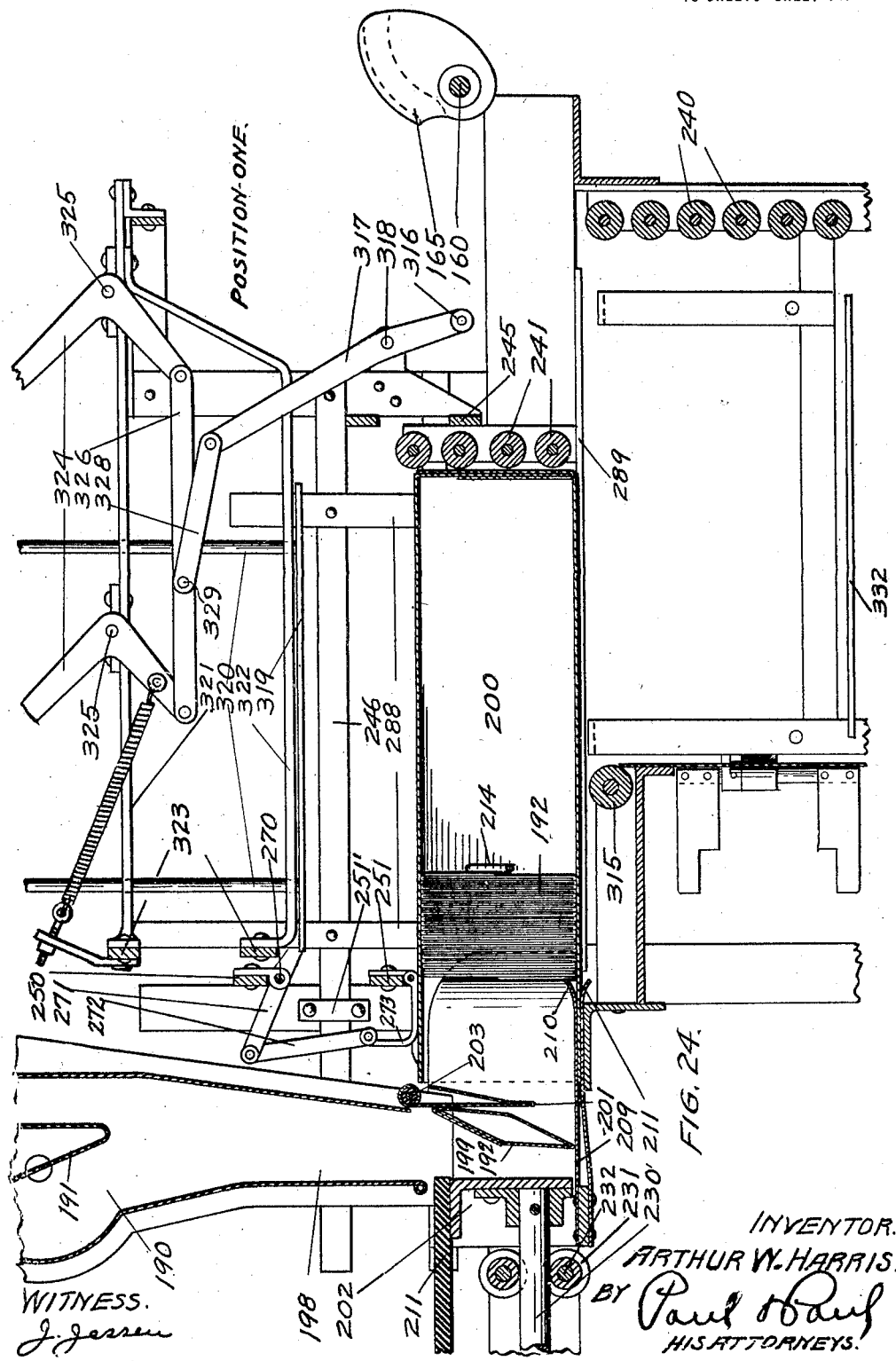

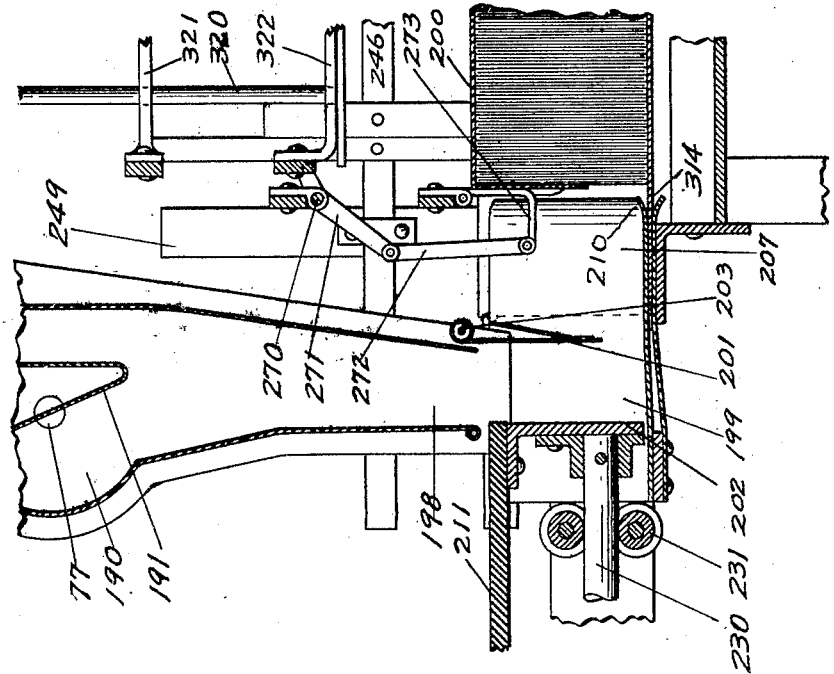
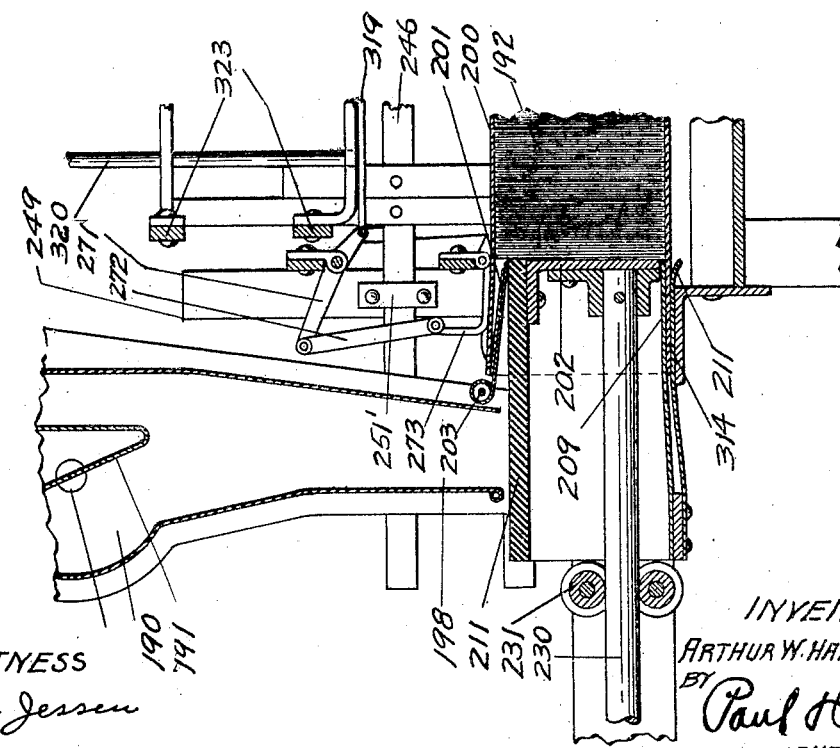

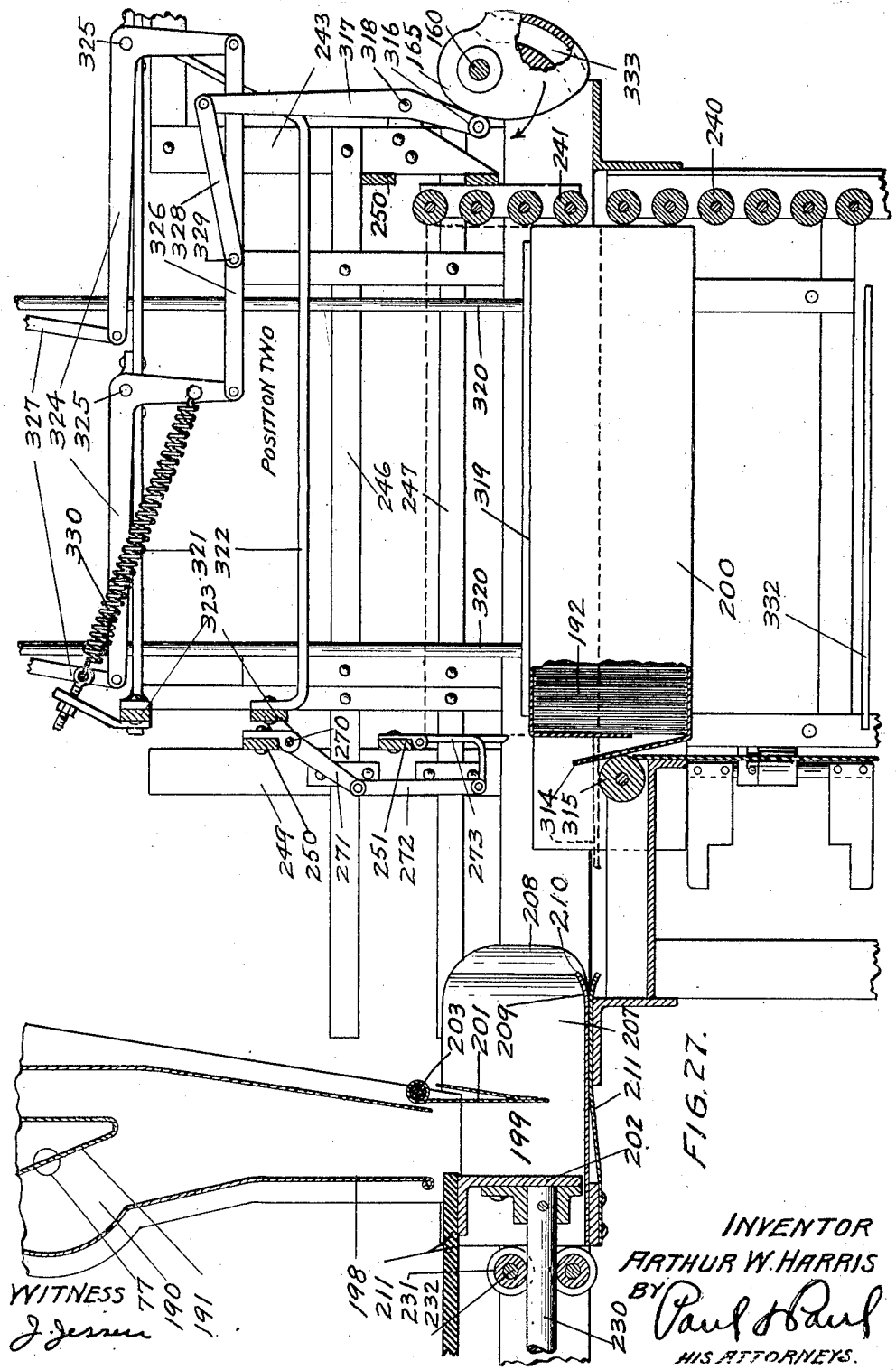

UNITED STATES PATENT OFFICE.

ARTHUR W. HARRIS, OF SLEEPY EYE, MINNESOTA.

CARTON-PACKING MECHANISM.

1,345,926.     Specification of Letters Patent.     Patented July 6, 1920.

Application filed January 17, 1919. Serial No. 271,636.

*To all whom it may concern:*

Be it known that I, ARTHUR W. HARRIS, a citizen of the United States, resident of Sleepy Eye, county of Brown, State of Minnesota, have invented certain new and useful Improvements in Carton-Packing Mechanism, of which the following is a specification.

My invention relates in general to the filling and packing of cartons with flat articles, and more particularly to such packing of flattened paper boxes or bands as they are discharged from the forming, collapsing and flattening mechanism of the machine illustrated and described in my pending application for U. S. patent, filed November 27, 1917, Serial No. 204,165.

The object of my invention is to provide mechanism, as a part of the machine referred to, for feeding and placing the empty cartons in the machine, filling and packing the cartons with the collapsed and flattened bands, removing the cartons after being filled to a position for closing the open end or mouth of the carton and after the closing operation, ejecting or dropping the packed carton from the machine.

Another object is to provide means for inverting and delivering the flat or collapsed bands to the carton so that the folded or lapped ends of the bands will be alternately reversed in position in the carton, thus preserving uniform alinement of the bands and greatly increasing the number of bands which may be packed into the carton.

My invention consists in mechanism for placing the carton, positioning and delivering the bands to the carton, holding the bands in position while being packed, removing the carton and means for driving, timing and coördinating the operating mechanism.

My invention further consists in various constructions and combinations, all as hereinafter described and particularly pointed out in the claims, taken in connection with the accompanying drawings, in which—

Figure 1 is a side elevation of the portion of a machine necessary to fully illustrate the invention and showing its connection with the box-forming and flattening mechanism, Fig. 2 is an end elevation on a larger scale of Fig. 1, Fig. 3 is a vertical transverse section on the line 3—3 of Fig. 1, Fig. 4 is a similar section, illustrating the carton feeding and placing mechanism, Fig. 5 is a horizontal section on the line 5—5 of Fig. 1, Fig. 6 is a part of Fig. 5, illustrating the mechanism for discharging the packed carton, Fig. 7 is a vertical longitudinal section on the line 7—7 of Fig. 5, Fig. 8 is a transverse vertical section on the line 8—8 of Fig. 5, Fig. 9 is a horizontal section of a part of the machine shown in Fig. 1, Fig. 10 is a section on the line 10—10 of Fig. 9, illustrating the clutch mechanism for starting and stopping the carton-holding carriage, Fig. 11 is a detail of the clutches shown in Fig. 10 and illustrates the preferred clutch construction for use throughout the machine, Fig. 12 is a detail view of the carton-placing and holding parts, illustrating how the carton is released after being filled, Fig. 13 shows the mouth of the carton with the band holders and packer in their relative positions before the packing of the carton is begun, Fig. 14 is a broken section on Fig. 13 showing the same parts in position after the carton is filled, Fig. 15 is a section on the line 15—15 of Fig. 13, illustrating the operation of the band holders, Fig. 16 is a section through the carton, further illustrating the operation of the band holders, Fig. 17 is a broken horizontal view of the carton carriage, Fig. 18 is a section on the line 18—18 of Fig. 17, illustrating the carriage operation, Fig. 19 is a detached view, illustrating more in detail the operation of the carriage, Fig. 20 is a horizontal section on the line 20—20 of Fig. 18, Fig. 21 is a sectional view through the band flattening jaws and discharging hopper, illustrating the position of the band as it is ejected from the band-former, and one of the two positions of the band inverter for directing the bands, Fig. 22 is a sectional view of the band hopper, illustrating the other position of the band inverter after inverting a band, Fig. 23 is a section on the line 23—23 of Fig. 1, illustrating the driving and clutch mechanism for the band inverter.

Fig. 24 is a vertical longitudinal section of the carton carriage, showing a carton in place and partly filled and illustrating the positions of the packing parts when ready to pack a band, Figs. 25 and 26 illustrate successive steps in the operation of packing the bands in the carton, Fig. 27 is a view similar to Fig. 24, showing the carriage and carton removed from the packing position and in the act of being conducted to the closing position.

The frame may be of any preferred construction adapted to support and connect the various coöperating parts and I shall not, therefore, describe it in detail but will designate it by the numeral 30 whenever it is hereafter referred to in the specification.

*The primary driving and controlling mechanism.*

Referring to Figs. 1, 5, 7 and 8, the primary or constantly revolving driving shaft 31 is mounted in suitable bearings on the frame 30 and provided with a driving pulley 32, bevel gear 33, clutch disk 34, clutch collar 35 and retaining collar 36. The bevel gear 33 meshes with another bevel gear 37 fastened to an upright shaft 38 journaled in frame bearings 39 and 40 and provided with a worm 41 and thrust collars 42 and 43. The worm 41 meshes with a worm wheel 44 arranged upon a primary controller shaft 45, also continuously revolving, mounted parallel to the shaft 31 in bearings 46 upon the frame 30. The speed ratio of the two continuously revolving shafts 31 and 45 is governed by the number of bands it is desired to pack into a carton, as the shaft 45 makes one revolution for each filled carton.

A clutch controlling arm 47 and clutch controlling disks 48 and 49 are fastened to the shaft 45 and revolve slowly therewith. On account of the very slow motion of the disks, especially when packing a large number of bands in a carton, I find it necessary to provide means for more quickly moving the clutch controlling parts at every revolution of the shaft 45. To this end the arm 47 and disks 48 and 49 are provided with yielding cam arms 50, 51 and 52, respectively, which by slight lateral movements may be made to quickly change their path of revolution. A stationary bracket 53 is supported on the shafts 31 and 45 and is provided with laterally adjustable but normally stationary bars 26 and 27, having beveled ends 28 and 29. A similar bar 23 having a beveled end 24 is arranged in a frame bracket 25. The shaft 45 revolves in the direction of the arrows and as the cam arms revolve they engage the beveled ends of the stationary bars 23, 26 and 27, at the clutch shifting point, and are quickly thrown from one position to the other, as indicated by dotted lines in Fig. 5. This action controls the starting and stopping of the intermittent driving mechanism for the different operations of the machine, as will hereinafter be more fully described.

Referring to Fig. 5, the three primary controlling clutch units, which I will designate A, B and C, furnish the driving power and control the main operations of the machine. The clutch unit A controls the band forming, flattening and packing operations, which are performed simultaneously. The clutch unit B controls the operation of feeding, placing and removing the carton while unit A is at rest.

The clutch unit C controls the closing and locking mechanism and coöperates with unit B in certain functions hereinafter described. The mechanism controlled by unit C is operated simultaneously with unit A during a part of the time the carton is being packed. As this mechanism forms no part of the present application, it will not be described in detail except in so far as it coördinates with and is necessary to the present invention.

*The intermittent driving gear.*

I will now describe the driving gear controlled by clutch unit A.

Referring to Figs. 1 and 8, a clutch 54 is loosely mounted on the shaft 31 and a sprocket 55 is rigidly secured to the hub of the clutch. A sprocket chain 56 connects the sprocket 54 to a sprocket 57, shown in dotted lines in Fig. 1, on a shaft 58 which operates the feeding rolls 59 and 60 for the band former 61 through a gear connection, not here shown, as it forms a part of my previous application above referred to. A gear 62 on the sprocket shaft 58 meshes with a gear 63 on a shaft 64 and a sprocket 65 on the same shaft transmits motion through a sprocket chain 66 and sprocket 67 to the crank shaft 68, (Fig. 1) operating the packer, as will hereinafter be fully described under the head of Packing and delivering mechanism.

The band former 61 (the subject matter of my application Serial No. 204,165) is operated simultaneously with the packer through an idler gear 69, pinion 70 and a clutch (not shown, being no part of the present invention). The idler gear 69 also simultaneously transmits motion to the band flattening mechanism through gears 71 and 72 upon shafts 73 and 74 respectively and to the band inverting and delivering mechanism through a gear 75 upon the shaft 73 and a gear 76 upon the band-inverting shaft 77 (Fig. 1) which is mounted in bearings 82$^a$. (See Fig. 23.) As the revolution of this shaft is intermittent, for reasons hereinafter described, it is provided with a clutch 78 (Fig. 23) rigidly fastened thereto. The gear 76 is loosely mounted on the shaft 77 and meshes with a gear 79 fastened to a shaft 80 having suitable bearings on the frame of the machine. The shafts 73 and 80 are arranged upon opposite sides of the inverter shaft 77 and carry cam-arms 83 and 84 and controller arms 83ª and 84ª adapted to control the operations of the clutch 78. (See Fig. 23). The construction of this clutch, as shown, differs slightly in detail from the clutches as hereinafter described, but its operation and control by the cam arms are the same. The preferred clutch construction is the subject-matter of a separate application, filed December 13, 1918, Serial No. 266,604, and I will now only describe it in sufficient detail to make its application to the present invention understood.

Referring to Figs. 10 and 11, the clutch body 85 is shown to be rigidly secured or splined to the shaft 86. A locking bolt or clutch pin 87 is arranged to slide in bearings 88 and 89 parallel with the shaft 86. A bell crank lever 90 is pivoted at 91 in a recess 92 through which the pin 87 passes and one end 93 of the bell crank engages a notch 94 in the pin. The other and forked end 95 embraces a rounded head 96 of a curved clutch lever 97, pivoted at 98 in a slotted recess 99 of the clutch body 85 and having an outwardly projecting lug 97'. A spring 100 tends to force this lug outwardly and at the same time tends to force the bell crank lever 90 and clutch pin 87 from the position shown in full lines in Fig. 11 to the dotted line position shown in the same figure. In the full line position the clutch pin 87 projects beyond the end of the clutch body at 101 and into an aperture of a flexible locking bar 102, secured to the frame 30 at 103. In this position the shaft 86 is locked against rotation and the clutch pin 87 is held in the locking position by means of a spring latch 104 pivoted to the clutch body at 105 having a projecting end 106 and tensioned by a spring 107 to engage a notch 108 in the pin 87. A driving clutch gear 109 is loosely journaled on the shaft 86 and is provided with one or more apertures 110, radially in line with the clutch pin 87. When the latch 104 is forced out of the notch 108 the tension of the spring 100 forces the clutch pin against the side of the revolving gear 109 in a position to quickly enter an aperture 110 and withdraw from the locking bar 102 and allow the shaft 86 to start. By this operation the clutch lever 97 is rocked on its pivot and the lug 97' is projected outward into the path of a revolving cam arm 111 arranged upon a shaft 112 and geared to rotate at equal speed with the gear 109 (see Fig. 11). When a full revolution of the shafts has been completed, the lip 99 will be forced backward by the cam arm 111 to the position shown in Fig. 10 and the parts restored to the locked position shown in Fig. 11. When the controller shaft 112 has completed another revolution, the clutch is again started by the controller arm 113 engaging the projecting end 106 of the latch 104 and unlocking the clutch pin. It will be understood that with an equal speed ratio of the clutch and controller shafts and a single controller arm, the clutch shaft will make one full revolution and will pause during the next full revolution of the controller shaft, and with two oppositely arranged controller shafts and arms the clutch shaft will rotate intermittently in half revolutions.

As shown in clutch units A, B and C, instead of the latch 104 for locking the clutch pin out of engagement with the rotating gear during the stops, the cam arm 111 might take the form of a circular disk with the lug 97' of the clutch lever 97 bearing against the periphery of the disk having a cutaway section to release the clutch, as shown at B and C in Fig. 5.

In the application of the clutch mechanism heretofore described to clutch units A, B and C, it will also be understood that clutch disk 34 and clutch collar 35 operate like the clutch gear 109 to drive the clutch and that clutch connections and releases are made in a similar way by the operation of the clutch lever 97. The clutch then will be in revolving connection only when the lug 97' of the clutch lever is free from the peripheral face of the controller arms or disks 47, 48, and 49, as shown at A in Fig. 5 and in a locked inoperative position when the clutch lever is forced backward by the controller arms, as shown at B and C. As soon as the cam or disk-faces are removed from the clutch lug 97' either laterally or radially, clutch connection is effected with the rotating clutch members.

The clutch 115, controlled by the clutch unit B, is loosely mounted upon the shaft 31. The clutch pin 87, shown in engagement with the locking bar 102, is adapted to make clutch connection with the clutch collar 35 when the clutch lever 97 is released (see Fig. 8).

A sprocket 116 is secured to the clutch body 115 and a chain 117 connects the sprocket 116 with a sprocket 118 upon a counter shaft 120, that is journaled in frame brackets 121 (Fig. 5). The shaft 120 carries a second and smaller sprocket 122 which, through a chain 123 and sprocket 124, transmits revolution to a short shaft 125 (Fig. 1). A small pinion 126, shown in dotted lines in Figs. 1 and 7, is fastened to the counter shaft 125 and meshes with gears 127 and 128. The gear 127 is secured upon the clutch controlling shaft 129 and meshes with the clutch gears 109 loosely mounted upon the clutch controlling shaft 129 and meshes with the clutch gears 109 loosely mounted upon the crank clutch shafts 130 and 131 to which clutches 132 and 133 are secured. The gears 109 again are in mesh with gears 134 upon the controller shafts 135 and 136, which revolve continuously while the clutch B is in operation. The controller shafts 129 and 135 carry cam arms 137 and 138 and controller arms 139 and 140 respectively for the operation of the clutch 132 and the controller shafts 129 and 136 carry cam arms 141 and 142 and controller arms 143 and 144 respectively for the operation of the clutch 133 (see Fig. 7).

As the timing and operation of this mechanism will be hereinafter described under the heading "General operation of the machine", I will continue the description of the driving mechanism. The clutch shafts 130 and 131, controller shafts 135, 136 and 129 and counter shaft 125 are journaled in bearings in a narrow frame section 114 (see Figs. 9 and 10) but the shaft 146 upon which the large gear 128 is secured (Fig. 1) has bearings in the main frame 30 and extends outward to where it is provided with a bevel gear 147 meshing with a driving bevel gear 148 on a longitudinal shaft 149 having bearings 150, 151, 152 and 153 on the main frame 30 and extending to the opposite end of the machine, where it is provided with cams 154 and 155 (Fig. 1). A short vertical shaft 156 is mounted in bearing blocks 157 and 158 and is driven from the shaft 149 by a pair of miter gears 159. The shaft 156 drives a horizontal cam shaft 160 through a pair of bevel gears 161. The cam shaft is journaled in bearings 162 and 163 and carries the cams 164 and 165, (Figs. 1, 2 and 9).

The intermittent driving gear for the closing and locking mechanism shown in Fig. 1 will be described only as it pertains to this application, as follows:

The clutch body 166 is loosely mounted on the shaft 31 and is adapted to make clutch connection with clutch collar 35, when its clutch lever 97 is released. It is provided with a gear 167, meshing with a large gear 168 on a shaft 169, having bearings 170 and 171 upon the frame 30. A vertical shaft 172 is arranged in bearings 173 and 174 and is driven from the shaft 169 by bevel gears 175 and a horizontal shaft 176 is driven from the shaft 172 by bevel gears 177 and 178. The shaft 176 is journaled in bearings on the main frame and is provided with a cam 179 (see Figs. 1 and 5). This cam coöperates with the cam 155 to perform a certain function of the machine which will be hereinafter described.

*The band flattener and inverter.*

The collapsing or flattening mechanism is a part of my application Serial No. 204,165, but will be briefly described in connection with the band inverting and delivering mechanism with which it has coöperating connections.

Referring to Figs. 1, 21, 22 and 23, the band flattener comprises a cushion supported jaw member 180 pivoted at 181 and a moving jaw member 182 pivoted at 183 to links 183'.

The two jaw members converge downwardly toward a discharge opening 184 at the bottom and the member 182 has a swinging upward motion actuated by a crank arm 82 upon the shaft 74 through connecting link 185 and a bell crank lever 186. This lever is pivoted to the frame bracket 187 at 188 and connected to the jaw member 182 by a link 189. Immediately below the flattening jaw is arranged a receiving hopper 190 in which a V-shaped flight 191 is arranged upon the intermittently turning shaft 77. The rotation of the crank shaft 74 is controlled by a clutch (not shown) which imparts an intermittent movement to the shaft of one complete revolution followed by a pause of equal duration. The square band or box 192 is ejected in a lateral direction from the band former (not shown) to the position between the angular converging jaws 180 and 182, shown in Fig. 21. Immediately thereafter the crank shaft 74 begins its revolution and the band is flattened and pressed between the two jaws, the pressure exerted against the band depending on the tension of the spring cushion 193. The toggle action of the bell crank lever 186 and connecting link 185 reduces the power required for the pressing operation. When the shaft 74 has completed its revolution and comes to a stop, the jaws 180 and 182 are in the original open bottom position, but the peculiar angular conformation of the flattening jaws which, in the extended square form of the band forms a support, now permits the collapsed and flattened band to drop through the bottom opening 184 into the hopper 190. While the crank shaft 74 has made a complete revolution to flatten and discharge the band, the inverter shaft 77 has made a half revolution and a pause and reversed the position of the flight to present the open or mouth end of the flight uppermost for the reception of the band, as shown in Fig. 21, or the narrow or closed end 196 uppermost, as shown in Fig. 22. As shown in Fig. 21, the band will drop into the open mouth and to the bottom of the flight and during the succeeding half revolution of the flight the band will be turned over and drop out of the flight in an inverted position with the lapped and locked end 197 pointing down, as shown in full lines in Fig. 22. During this inverting operation another band has been inserted between the jaws, ready to be flattened and this band, when discharged from the jaws, will slide down over the outside face of the flight in the original position, with the lapped and locked end pointing up, as shown in dotted lines in Fig. 21. The intermittent revolutions of the crank shaft 74 and inverted shaft 77 are timed to cause the flattened bands to drop in alternating inverted positions and at somewhat irregular intervals from the hopper 190 through the vertical spout or conductor 198 to the packing chamber 199, (Fig. 24).

*The packer and band holding mechanism.*

The carton 200 in which the flattened bands 192 are to be packed is placed in the position shown in Figs. 13, 14, 24, 25 and 26 by means hereinafter described. The bands are guided in an upright position to the packing chamber 192 by the converging side walls of the vertical conductor 198 and are delivered to the chamber between the pivoted guide plate 201 and the packer head or plunger 202. The guide plate is secured to a spindle 203 having bearings in the walls of the spout 198 and provided with a short, rigidly secured arm 204, as shown in Fig. 1. A coil spring 205 connected to the end of the arm and to the frame at 206 tends to hold the guide plate 201 in the vertical position shown in Figs. 24, 26 and 27 and at the same time permits the plate to swing to the horizontal position shown in Fig. 25. The sides of the packing chamber consist of yielding spring plates 207 fastened to the frame 30 and converging inwardly, preferably provided with outwardly bent retaining ends 208 (Fig. 13). The bottom of the chamber consists of a similar spring plate 209 having an upturned retaining end 210 (Fig. 14). The four end flaps of the square carton 200, when in position for packing, fit over the plates 207 and 209, the end of the plates being about even with the folding creases of the flaps. The bands during the packing operation are supported in an upright position in the carton by side rods 212 passing through openings in the converging side plates 207 and into the carton where they are provided with inwardly extending hooks 214. These hooks hold the bands in an upright position in the carton and provision is made for automatically advancing the hooks while the carton is being filled and withdrawing them when the packing of the carton is completed. To this end the rods pass backward through the packing chamber and enter long tubes or pipes 215, rotatably supported on the frame 30 and provided with end plugs 216 and 217 and longitudinal slots 218. The rods are slidable in plugs 216 and at the extreme left hand end are provided with retaining collars 219, having pins 220 projecting into the slots 218 (see Fig. 13). Long coil springs 221 embrace the rods 212 and bearing against the collar 219 and pipe plug 216 normally hold the rods in the left hand or retracted position, with the collar resting against the pipe plug 217, as shown in Fig. 13.

The pipe plugs 216 and 217 have projecting ends 222 journaled in blocks 223 and 224, attached to the frame 30. The plugs 217 are provided with tilting arms 225 and 226 by means of which the pipes may be tilted backward and forward in movements limited by stops 227 and 228, as shown in Fig. 15. The means for timing and causing the tilting of the arms 225 are a part of the carton-placing mechanism and will be described under this heading, but the object of the tilting movement is to bring the hooks 214 of the rods 212 into the position shown in full lines in Figs. 13, 14 and 15 before and during the operation of filling and packing the carton and to turn the hooks in the direction of the arrow in Fig. 15 close to the carton walls for their release from the bands and removal from the carton, the space 229 between the bands and the carton walls being sufficient to permit of the withdrawal of the hooks when in a vertical position.

The plunger or packing head 202 for the packing of the bands is carried on the end of a rod 230 supported between guide rolls 231, arranged on the stationary pins 232 secured to the frame 30. The plunger rod 230 is operated from the crank shaft 68 by means of the crank arm 233, connecting link 234 and toggle joint links 235 and 236. The yoked toggle link 236 is pivoted to the frame 30 at 237, the toggle link 236 to the plunger rod at 238, and both toggle links to the connecting link or rod 234 at 239 (see Figs. 1 and 7).

In the operation of packing, the carton being supported in place for packing, as hereinafter described, as a band is discharged from the flattener and drops between the guide plate 201 and packer head 202, to the upright position shown in Fig. 24, the packer head or plunger 202 will advance, forcing the band against the guide plate and gradually raising the plate to a horizontal position, while the band will be kept in an upright position by the resistance of the yielding side plates 207, guide plates 201 and bottom plate 209. Assuming the first band being packed and just before the completion of the plunger stroke, the hooks 214 will be forced slightly forward against the tension of the spring 209, as shown in Fig. 13, where the stroke is shown completed and the plunger reversed, the first band being in the position assumed at the end of the stroke, the retaining ends of the plates 209 and 207 having passed back of the band and the spring pressed hooks 214 holding the band against the ends of the plates. I prefer to extend the top 211 of the plunger 202 backward, as shown in Figs. 25 and 27, to receive the bands before they drop to the bottom of the packing chamber and hold them up until the plunger is withdrawn from the chamber.

The next band delivered to the chamber will be inverted with respect to the previous one and this alternate inversion of the bands will continue throughout the packing of the carton, as indicated in Fig. 24, until the carton is completely filled and the parts assume the position shown in Fig. 14, when the package of bands will be the same thickness on each end and will fit evenly and smoothly in the carton.

When the carton is filled, the hooks are turned downward and when released from the pressure of the bands are forced backward by the springs 221, permitting the removal of the carton. The slots 218 in the pipes 215, collars 219 and pins 220 engaging the slots 218 provide means for effecting both the longitudinal and turning movement of the hooked rods 212 (Fig. 13).

*The carton delivering and supporting mechanism.*

The driving gear for this mechanism has been described as controlled by the clutch unit B and it begins action when the packing operation stops. The mechanism comprises a carriage movable in two sections, with means for delivering the empty cartons to this carriage and for supporting and removing the cartons from the carriage. The construction of this carriage is best illustrated in Figs. 1, 3, 6, 9, 12 and 17 to 20, where 242 represents grooved rails of the frame 30, upon which the carriage is slidably supported, and 241 end supports for the cartons. (See Figs. 14, 24 and 27.)

In filling and packing the carton, the end flaps for closing the filling end after the packing is completed are opened and extended and it is necessary to insert the flattened bands or boxes between the extended flaps in packing the carton. Means is therefore provided in connection with the packing chamber to pass between the opposite flaps and hold them in an open position while the packing operation is being performed. To insert this retaining means between the flaps, the carton is moved longitudinally to the packing chamber. When the carton is filled up to the scoring line and is moved away from the retaining device to disengage the flaps therefrom, some means movable with the carton is necessary for supporting the flattened bands in the carton until the flaps are closed. The carton is delivered to the machine sidewise and with the flaps opened and when the support for the bands has performed its function, it is necessary to withdraw it from its working position to permit the introduction of the empty carton. Provision is therefore made for moving the band supporting mechanism independently of the main carton supporting carriage. This independent movement I prefer to accomplish by providing an auxiliary carriage whereon the band supporting means is mounted. These two carriages, the main and the auxiliary, have independent crank shafts and connecting bars, as will be hereinafter described in detail. The initial movement of the crank connected with the auxiliary carriage retracts the band support while the auxiliary carriage is temporarily stationary and an empty carton is being inserted into the main carriage. When this band support has been retracted, the auxiliary carriage and the main carriage are moved to the packing position, ready to receive the bands or boxes from the packing chamber, as will hereinafter appear more in detail in the general description of the operation of the machine.

This main and auxiliary carriage construction allows me to provide means for holding the bands in place in the filled carton before the flaps are closed and withdraw this holding means out of the path of the empty carton when it is desired to place it in the main carriage. I may also, with this construction, provide a movement of the main carriage from a discharging to a packing position so that during such movement the means in connection with the packing chamber for holding the carton flaps in place during the packing operation can be readily inserted mechanically between the flaps of the carton.

The main carriage section consists of two vertical posts 243 having rigid horizontal, longitudinal bars 244 at their lower end adapted to slide in the grooved rails 242, as shown in Figs. 3, 17 and 18. Cross bars 245 connect the posts 243 (Figs. 2 and 3) and horizontal longitudinal rails 246 and 247 and 246' and 247' are rigidly secured to the posts 243. The end supports 241 are arranged upon the posts 243.

The auxiliary carriage section is composed of the two vertical posts 248 and 249, having cross bars 250 and 251, and also having rigid horizontal bars 252 adapted to slide in the grooved rails 242 and clips 251' through which the horizontal rails 246 and 247 of the main carriage loosely pass. Retaining strips 253 for the sliding bars 244 and 252 are fastened to the grooved rails 242. The main carriage is operated from the clutch shaft 131 (see Figs. 1, 9 and 10) by means of crank arms 255, connecting rods 256 and linked bars 257. These bars are slidably connected to the vertical posts of both carriages, but limiting stops 258 and 259 are provided for the main carriage whereby a short idle movement of the bars 257 at the beginning of each stroke of the crank arm 255 is effected.

The auxiliary carriage is operated from the clutch shaft 130 by crank arms 259ª connecting rods 260 and 266 having sliding connections with the vertical posts 248 and 249, limited by stops 261 and 262 (see Fig. 1). A link 263 (Fig. 17) is pivoted to the connecting rod 266 at 264 and to a bell crank lever 265, as best shown in Figs. 7, 17, 18 and 19. A vertical link 267 connects the bell crank with an arm 268 secured to a shaft 270 and an arm 271 (Figs. 24, 25, 26 and 27) fastened to the shaft 270 is connected by a link 272 to a curved retaining arm 273. This arm normally rests on the upper flap of the carton when packing, as shown in Figs. 24 and 25, and has the function of closing this flap after the carton is filled, as shown in Fig. 26.

The means for delivering the empty cartons to the carriage, supporting the carton in the carriage and removing the carton for the end closing operation will now be made clear.

I prefer to arrange a chute 274 (Fig. 4) into which the cartons may be placed by the attendant and as the cartons emerge from the bottom of the chute they are caught on a plate 275 arranged upon a movable skeleton frame 276. The raised horizontal rail 277 of the skeleton frame supports the cartons in the chute when the lower carton on the plate 275 is fed to the machine, as indicated in dotted lines in Fig. 4. The link bars 278 and 279 are pivoted below at 280 to frame brackets 281 and a link 284 connects the outer link bar with a follower lever 282 that is pivoted at 283 to the frame 30, and is at the upper end provided with a roller 285. A coil spring 286 tends to hold the roller against the cam 154 on the shaft 149 and when the shaft is rotated in the direction of the arrow the parts will assume the position shown in dotted lines in Fig. 4 and a carton will be delivered through the open space 287 against vertical stop bars 288 and dropped upon the supporting shelves 289, as shown in full lines in Fig. 3. The shelves 289 are supported on parallel link bars 290 pivoted to the frame 30 at 291 and to the shelves at 292 (Fig. 17). The link bars are provided with pins 293 projecting through slots 294 in the frame 30 and tensioned by a spring 293′ against the bottom of the slots, holding the shelves in position for supporting the carton, as shown in Figs. 3 and 17. When the carton is to be removed, the carriage is moved forward or to the right and projecting lips 295 arranged upon the carriage slides 252 engage the pins 293, swing the link bars 260 and shelves 288 to the position shown in Figs. 4 and 20 and allow the carton to be removed.

To properly aline the cartons for packing I prefer to tension the carton against the vertical stop-bars 288 and as a further precaution I prefer to drop retaining bars 296 back of the carton after it is in place, as illustrated in Figs. 3 and 4. The tension device consists of strips 297 and 298 supported on pins 299, passing through the frame portion 242 having sockets for coil springs 300 and 300′, tensioned to force the strips inward. The pins 299 are provided with slots 301 through which flat cam bars 303, fastened to the main carriage posts 243, are adapted to slide when the carriage is moved. Recesses 304 having inclined edges 305 are provided in the bars 303 and when the carriage is in position for packing the carton, the recesses register with the pins 299 and the springs 300 force the strips 297 against the carton, as shown in Figs. 3 and 9.

In practice, I prefer to have the tension of the springs 300 slightly stronger than the springs 301′ to force the carton against the stop bars 288. When the carriage is moved to the right for the removal of the carton, the first movement engages the inclined edges of the recess 304 to the outer pin ends 302 of the slots 301, forcing the strips backward away from the carton, as shown in Figs. 4 and 12, and at the last part of the movement the parallel link pins 293 are engaged by the projecting lugs 295, forcing the link bars 290 and shelves 289 to the position shown in Figs. 4 and 20, allowing the removal of the carton. On the reverse movement of the carriage, the carton is timed to drop from the feeding plate 275 between the time the shelves 289 have again been forced in a supporting position by the springs 293′ and the strips 297 forced inward by the springs 300 and 300′.

The raising of the retaining bars 296 when the carton is to be delivered from the feed shelf 289 is attained as follows:

Bell cranks 305 are pivoted at 306 to the horizontal carriage rails 247′ and are connected together by a link 307 and are connected to the retainer bars 296 by links 308. The bars 296 slide freely through slots 309 in the rails 247′ and are preferably held down by gravity alone. A lever 310, pivoted at 311 in the carriage post 243, is connected at its long end by a link 312 to the bell crank 305. The short end of the lever is provided with a roller 313 (Fig. 1) that is adapted to come in engagement with the cam 164 on the shaft 160 when the carriage is moved to the right for the replacing of the cartons. The rotation of the cam 164 when in this position operates to raise the retainer bars 296 through the connecting link 308, bell cranks 305, link 312, lever 310 and rollers 313 and keep them raised, as shown in Fig. 4, until an empty carton has been inserted.

To simplify the construction, I prefer to close the top and bottom flaps of the carton in the operation of moving the carton from the packing to the final closing and locking mechanism. The means for closing the top flap has been partially described and referring to Figs. 1, 7, 18, 19 and 26, it will be seen that when the carriage is to be moved to the right, after the carton is filled, the first effect of the movement of the crank arms 259ª in the direction of the arrow is to slide the connecting rods 266 freely through the slots of the vertical posts of the carriage until the stops 261 strike the post. By this action the bell crank 265 will be thrown from the position shown in full lines in Figs. 7 and 19 to that shown in dotted lines in Fig. 19 and full lines in Fig. 18 and the curved arm 273, resting on the top flap of the carton during the packing operation, as shown in Figs. 24 and 25, will be thrown 90 degrees to the position shown in Fig. 26, closing the flap and holding the bands in place. The two crank shafts 130 and 131 start to rotate and complete one-half a revolution at the same time and during the operation just described the crank 259ª, moving in the direction of the arrow at first also cause the connecting links 257 to slide freely through the slotted connection in the posts 243 of the main carriage until simultaneously with the engagement of the stops 258 and 261 the two carriage sections are moved together to the right during the half a revolution of the crank shafts 130 and 131, when both cranks come to a stop and the carriages are in the position shown in Fig. 27. As heretofore described, this movement has the effect of releasing the carton from its support in the carriage and only the bottom flap 314 is supported on the roller 315, as indicated in dotted lines in Fig. 27.

Just before the travel of the carriages is completed, the roller 316 of a lever 317, pivoted to the carriage at 318, engages the cam 165 and the lever is quickly thrown from position one in Fig. 1 to position two in full lines in Fig. 27. The result of this is to move the vertical plunger, 319 normally resting in a raised position some distance above the cartons, as shown in Figs. 1 and 3, down to the carton. The plunger consists of the bottom plate 319 secured to vertical rods 320, freely sliding through suitable bearings in the bars 321 and 322 fastened to cross pieces 323 of the main carriage frame. Bell crank levers 324 have pivoted connections to the frame of the carriage at 325 and are connected together by a link 326 Figs. 24 and 27 and to the plunger rods by links 327. A link 328 pivoted at 329 to the link 326 furnishes the operative connection to the lever 317, and the plunger is normally held in a raised position by means of a spring 330 connected to the bell crank 324. When the plunger on the downward stroke reaches the carton, the cam, normally stationary as in Fig. 1, has revolved to nearly the position shown in Fig. 27 and, as shown, the continued revolution of the cam in the direction of the arrow has moved the carton downward between stationary guides 240 on the frame 30 and the roller 315. This operation closes the lower end flap 314 of the carton and the downward movement of the carton is continued until it reaches the lower supporting shelves 332. During this time the cam roller 316 has entered the closed groove portion 333 of the cam 165 and as the cam shaft 160 completes the full revolution the plunger is raised to the full line position in Fig. 24.

The means for supporting the cartons while they are being closed and locked and for finally discharging them from the machine are briefly as follows:

The cartons 200, resting on the shelves 332, are supported on one side by rigid vertical guide strips 254 and spring guide strips 334 on the other side, as shown in Figs. 4, 5 and 6. The strips 334 are provided with slotted projections 335 extending loosely through stationary angle bars 336. A flat cam bar 337 having recesses formed with inclined cam faces 338 is arranged in the slots 339 of the projections 335 to bear against the angle bars 336 and with the cam faces 338 against the walls of the slots 339 (see Figs. 5 and 6). A link 340 is connected to the bar 337 at 341 and to a lever 342 pivoted to the frame 30 at 343. The lever 342 is also connected by links 344 and 345 to arms 346 and 347 respectively. These arms are pivotally connected to the rigidly secured frame pieces 348 and 349 and to the supporting shelves 332 and parallel arms 350 are similarly connected. The result of this construction and linking is that when the lever 342 is rocked from the position shown in Fig. 5 the supporting shelves 332 and spring-pressed guide strips are withdrawn from the carton and the completed carton permitted to drop into a chute or conveyer 351. The rocking of the lever 342 in both directions I prefer to make a joint operation of the cams 179 and 155, although it is evident that by the use of a spring or a grooved cam on the shaft 149 the cam 179 might be omitted. A lever 353 is pivoted at 354 to the frame 30 and engages with the curved upper end the cam 155 upon the shaft 149 (see Figs. 1 and 5). Its lower end is connected by links 355 and 352 to the links for the lever 342 and also to a pivoted lever 356 having operative contact with the cam 179 upon the shaft 176.

*The general operation and timing.*

It will be assumed that 250 bands are required to be packed into a carton and that the operation of forming, flattening and packing has just begun. The primary driving mechanism will then be in the position shown in Figs. 5, 7 and 8, with clutch unit B just out of operation and unit A immediately started. It is further assumed that the gear ratio of the driving mechanism is such that one band is formed, flattened and packed for every revolution of the main driving shaft 31 and that ten revolutions of this shaft are required for the removal of the filled carton and replacing it with an empty one. Clutch unit A will therefore cause operation for 250 revolutions of its controlled mechanism and a pause for ten revolutions; clutch unit B will cause operation for ten revolutions of its mechanism and a rest for 250 revolutions, and when one mechanism is in operation, the other will be at rest. The controller shaft 45 will therefore be required to rotate only one revolution while the main driving shaft 31 rotates 260 revolutions. At the end of 250 revolutions the carton is packed with the required number of bands and clutch unit A stops the clutch 54. Immediately clutch unit B starts the clutch 115 and with it the train of gears controlling the crankshaft clutches 132 and 133, the longitudinal cam shaft 149 and transverse cam shaft 160. The shafts for the clutches are geared to complete two revolutions and the cam shafts 149 and 160, one revolution to the ten revolutions required for the carton placing operation.

The controller shafts 135 and 136, turning in the direction of the arrows in Fig. 10, operate through their arms 137 and 142 to release and start the clutch shafts 130 and 131 in the direction of the arrows and through their crank arms and connections start to move the carton carriages to the right hand position in the manner previously described. The first upward movement of the crank arms 259 and rod 260 causes the rod clips 266' to engage the tilting arms 255 and tilt or rock the pipes 215 from the full to the dotted line position shown in Fig. 16 and the band supporting hooks 214 in the direction of the arrows in Fig. 15. The carton can now be removed from the packer and as the first slack or idle portion of the forward stroke of the crank arms closes the upper flap of the carton down, to hold the bands in place, as described, the completion of the stroke moves the carton carriage away from the packer to the position in Fig. 27, when both crank shafts are stopped by the operation of the controller arms 138 and 143 on the central shaft 129. At this point the crank shaft 130 stops for one-sixth of a revolution or until the carton has been forced down to the position shown, when it is again started by the controller arm 140 to complete the revolution and move the auxiliary carriage back to the dotted line position in Fig. 19, where it is stopped by a cam arm 137. The downward movement of the connecting rod 260 during this last half revolution operates to engage the tilting arms 226 and bring the hooks 214 to the original position in Fig. 15 and the reverse stroke of the connecting rod 266, before the stop 262 engages the post 249 and operates the bell crank 265 to raise the curved retaining arm 273. The retaining bars 296 having been raised, as previously described, and the vertical plunger having descended and ascended by the continued rotation of the cam 165, the carriage is now in a position to receive a fresh or empty carton. The cam 154 operating the feeding mechanism is turned to start and deliver the carton through the feed opening 287 just as the plunger 254 rises above the opening. As the feeder is withdrawn to drop the carton on the shelves, the crank shaft 131 is started by the controller arm 143 to complete the revolution and move the carriage back to the packing position, when the shaft 131 is again stopped by the cam arm 142.

In moving the carton into packing position, it is supported, as heretofore described, and the flaps are guided over the spring plates 207 and 209 by the curved retaining ends 210. Immediately after the stoppage of the crank shaft 136 the main controller shaft 45 has completed a full revolution and the delivering mechanism is stopped and the packing operation resumed. During this operation, the closing and locking of the carton end is also performed while the carton is supported on the lower shelves, as previously explained, and clutch unit C is timed accordingly. When this operation is completed, the supporting parts for the carton are removed by the action of the cam 160 and the carton is discharged.

It is evident that various deviations from the detailed construction shown may be made without departing from the principle of the invention, and I do not, therefore, limit myself to the exact construction shown.

I claim as my invention:

1. The combination, with a driving shaft, of mechanism for flattening and packing a flexible article, a driving mechanism connecting said mechanism with said shaft, mechanism for placing an empty carton in position to receive the articles and for discharging the filled carton, a driving mechanism connecting said carton placing mechanism with said shaft, and means for controlling the time and sequence of operation of said mechanisms for regulating the number of articles packed.

2. The combination, with a driving shaft, of mechanism for flattening and packing a flexible article, a clutch unit connecting said mechanism with said shaft, mechanism for placing an empty carton in position to receive the articles and for discharging the filled carton, a clutch unit connecting said carton placing mechanism with said shaft and means for controlling the time and duration of operation of said clutch units and thereby regulating the number of articles packed.

3. The combination, with a driving shaft, of mechanism for packing a folded flexible article, a clutch unit connecting said mechanism with said shaft, mechanism for placing an empty carton in position to receive the articles to be packed, a clutch unit connecting said carton placing mechanism with said shaft, and means for controlling the period of operation of said clutch units.

4. The combination, with a driving shaft, of mechanism for packing articles, a clutch unit connecting said mechanism with said shaft mechanism for placing an empty carton in position to receive the articles to be packed, a clutch unit connecting said carton placing mechanism with said shaft, and a controller shaft and means associated therewith for regulating the duration of operation of said clutch units.

5. The combination, with a driving shaft, of mechanism for packing articles, a clutch unit connecting said mechanism with said shaft mechanism for placing an empty carton in position to receive the articles to be packed, a clutch unit connecting said carton packing mechanism with said shaft, and a controller shaft and means associated therewith for regulating the duration of operation of said clutch units, said controller shaft being mounted to make a single revolution to a predetermined number of revolutions of said driving shaft in filling a carton.

6. The combination, with a driving shaft, of mechanism for packing articles, a clutch unit and gearing therefor connecting said mechanism with said shaft, mechanism for placing an empty carton and for discharging a filled one, a clutch unit and gearing therefor connecting said carton-placing mechanism with said driving shaft, mechanism for rendering one clutch unit temporarily inactive while the other clutch unit is in action, and means for controlling the duration of operation of said clutch units.

7. The combination, with a driving shaft, of mechanism for packing articles, a clutch unit and gearing therefor connecting said mechanism with said shaft, said clutch unit being mounted to operate continuously for a predetermined period and then stop temporarily for a predetermined period, mechanism for placing an empty carton in position to receive said folded articles and for discharging a filled one, a clutch unit, a gearing therefor connecting said carton placing mechanism with said shaft, and normally at rest while said first named clutch unit is in operation, means for starting said gearing when said first named clutch unit ceases operation, and means for controlling the duration of operation of said clutch units and mechanisms.

8. In a carton filling and packing machine, a packing chamber, means for flattening the flexible articles having lapped ends and for delivering them to said chamber, and means for inverting some of the articles to compensate for the difference in thickness of the ends of the articles.

9. In a carton filling and packing machine, a packing chamber, means for flattening the bands having lapped ends and for delivering them to said chamber, and means for inverting the alternate bands for arrangement of adjoining bands with their lapped ends in staggered relation in the carton.

10. In a carton filling and packing machine, a packing chamber, means for flattening the articles to be packed and a revolving inverter device mounted to receive said articles and invert them before delivery to said chamber.

11. In a carton filling and packing machine, a packing chamber, means for flattening the flexible articles to be packed, a receiving hopper leading from said flattening means to said chamber and a V-shaped flight mounted to revolve in said receiving hopper and invert the flexible articles passing from said flattening means to said chamber, for the purpose specified.

12. In a carton filling and packing machine, a packing chamber, means for delivering articles thereto, means for supporting the carton to be packed opposite said chamber, a packing plunger operating through said chamber to deliver the articles to the carton and provided with means for temporarily checking the delivery of articles to said chamber on the forward or packing stroke of said plunger.

13. In a carton filling and packing chamber, means for delivering articles to be packed thereto, spring plates mounted in the walls of said chamber and adapted to project into the open end of the carton to be packed, said plates having inwardly turned ends, means for supporting the carton to be packed in position to receive said plates, a packing plunger operating between said plates to deliver the articles to the carton, said inwardly turned plate ends forming stops to prevent backward movement of the articles on the return stroke of the plunger.

14. A carton filling and packing device for flattened objects, comprising a packer, a feeder for delivering the flat objects edgewise to said packer, means coöperating with the packer for inserting the flat objects into the carton crosswise to the walls thereof, and means for supporting the flat objects in a crosswise position in the carton while it is being filled.

15. A carton filling and packing device for flattened objects, comprising a packer, a feeder for delivering the flat objects edgewise to said packer, means coöperating with the packer for inserting the flat objects into the carton crosswise to the walls thereof, means for supporting the flat objects in a crosswise position in the carton, and means for removing the supporting means when the filling and packing of the carton is finished.

16. A carton filling and packing device for flattened articles comprising a packer, a feed hopper for delivering flattened objects edgewise to said packer, and means in said hopper to receive and invert an article therein before delivery to said packer and periodically deflect an article into said packer without inverting the article.

17. In a carton packing machine, a packing chamber, an axially mounted inverting member, means for feeding a flat article edgewise into said inverting member, means for periodically revolving said inverting member to discharge one article therefrom, said member having walls for directing the next article past it while inverted, and means for conducting the articles from said member to said chamber.

18. A carton filling and packing device comprising a packing chamber having a feed opening and a discharge opening, means for supporting a carton in open communication with the discharge opening of said chamber, a packer plunger in said chamber, a guiding member mounted in said chamber, means for feeding flattened bands, between the plunger and said guiding members, and means coöperating with the plunger and said guiding member for inserting the flat objects into the carton crosswise to the walls thereof.

19. A carton filling and packing device in combination with a packing chamber having a feeder opening and a discharge opening, of inwardly converging yielding guide plates in the walls of said chamber, means for supporting the open end of a carton in contact with said guide plates, a packer plunger in said chamber, a transverse plate mounted in said chamber, means for feeding articles between the plunger and said transverse plate, and means coöperating with the plunger and the transverse plate for inserting the articles into the carton crosswise to the walls thereof.

20. A mechanism for packing articles in a carton transversely thereof comprising a carriage for moving and supporting the carton in a packing position, means for packing the articles in a transverse position in the carton, means for moving said carriage and carton when the packing is completed to the carton discharging position, and means coöperating with the carriage moving means for supporting the articles in said transverse position in the carton while the carton is being moved to said discharging position.

21. A mechanism for packing articles in a carton comprising a carriage for moving and supporting the carton in a packing position, means for packing the articles in a transverse position in the carton, means for moving said carriage and carton to a discharging position when the packing is completed, means coöperating with the carriage moving means for supporting the articles in said transverse position in the carton while the carton is being moved to said discharging position, a driving means, mechanisms connecting said carriage and said supporting means with said driving means, and a timing means for said mechanisms.

22. A mechanism for packing articles in a carton comprising a reciprocating carriage for moving and supporting the carton in packing position, means for packing said articles in a transverse position in the carton, means for moving said carriage and carton when the packing is completed to the carton discharging position, and oscillating means coöperating with said carriage moving means for supporting the articles in said transverse position in the carton while the carton is being moved to said discharging position.

23. A mechanism for packing articles in a carton in a transverse position comprising a main carriage adapted to receive and support the carton to be packed, means for packing the articles in a transverse position in the carton, means for moving said carriage and carton when the packing is completed to the carton discharging position, and an auxiliary carriage relatively movable with said main carriage having means for supporting the articles in said transverse position in the carton when the carton is being moved to its discharging position.

24. A mechanism for packing flat articles in a carton comprising a main carriage adapted for supporting the carton in a packing position, means for packing the articles in a transverse position in the carton, means for moving said carriage and carton to the carton discharging position when the packing is completed, an auxiliary carriage relatively movable with said main carriage, a guide arm carried by said auxiliary carriage and means for projecting said guide arm to support the articles in the carton while said main carriage and carton are being moved to the discharging position.

25. A mechanism for packing flat articles in a carton comprising a main carriage adapted for supporting the carton in a packing position, means for packing the articles in a transverse position in the carton, means yieldingly mounted in the walls of said carriage for gripping the side walls of the carton, means for moving said carriage and carton to a discharging position when the packing is completed, and means mounted to be projected into the carton for holding the articles against displacement therein while said carriage and carton are being moved from a packing to a discharging position.

26. A mechanism for packing articles in a carton comprising a reciprocating carriage adapted to support a carton and having a packing and discharging position, means for reciprocating said carriage at predetermined intervals, an auxiliary carriage also having a reciprocating movement and means for operating it, and a curved arm mounted on said auxiliary carriage and normally retracted from said carton and means for swinging said arm into said carton to engage and support the articles therein while said main carriage is being moved from its packing to its discharging position.

27. A mechanism for packing articles in a carton comprising a main carriage adapted to support a carton, mechanism for packing the articles in the carton so supported, an auxiliary carriage having a relative movement with said main carriage, crank shafts and connecting rods for said main and auxiliary carriages, a driving means for said crank shafts, mechanism for timing the movement of said main carriage crank shaft to move said main carriage and carton to a packing position, and after a predetermined interval to its discharging position, means carried by said auxiliary carriage for supporting the articles in the carton while said main carriage is moving to its discharging position, and a mechanism for timing the movement of said auxiliary carriage crank shaft and said supporting means.

28. A mechanism for packing articles in a carton comprising a reciprocating carriage adapted to receive and support a carton in packing position, means for packing the articles in a transverse position in the carton, means for moving said carriage and carton to a discharging position when the packing is completed, means for holding the articles in position in the carton while being so moved, means coöperating with said carriage moving means for closing the end of the carton.

29. A mechanism for packing flat articles in a carton comprising a carriage adapted to support a carton in a packing position, means for packing articles in a transverse position in the carton, means for moving said carriage and carton to a discharging position when the packing operation is completed, and means for partially closing the open end of the carton to support the articles therein while the carton is being moved from its packing to its discharging position.

30. A mechanism for packing articles in a carton comprising a carriage adapted to support a carton in its packing position, means for packing articles transversely in the carton, means for moving said carriage and carton from its packing to its discharging position, and mechanism for folding a loose flap of the carton inwardly against the articles therein for supporting them in the carton while it is being moved to its discharging position.

31. A mechanism for packing flat articles in a carton comprising a carriage, a packing chamber, a packing plunger operating through said chamber to feed the articles into the carton, yielding means projecting into the carton and against which the articles delivered to the carton are packed, and means preventing rebound of the articles in the carton when the plunger is retracted.

32. A mechanism for packing flat articles in a carton comprising a carriage adapted to support a carton in its packing position, a packing chamber opposite which the open end of the carton is supported on said carriage, a plunger operating through said chamber to feed the articles into said carton, rods projecting into the carton and yieldingly held therein and against which rods the articles are packed, and means preventing rebound of the articles forced against said rods by said plunger when the plunger is retracted.

33. A mechanism for packing cartons comprising a carriage adapted to support a carton in its packing position, a packing chamber opposite which the carton is arranged, a plunger operating through said chamber to pack the articles in the carton, rods projecting into the carton and having inwardly turned ends against which the articles are seated, springs for yieldingly resisting pressure on said rods, said rods being mounted for rotation to withdraw them from the filled carton between the walls thereof and said articles when the packing operation is completed.

34. A mechanism for packing cartons with flat articles comprising a carriage adapted to support the carton to be filled, a packing chamber and packing plunger operating therethrough to feed the articles into the carton, mechanism for automatically delivering the articles to said packing chamber, mechanism for holding the articles in the carton on the return stroke of the plunger, mechanism for moving said carriage to its discharging position and for discharging the filled carton, and means for timing the sequence of operation of said mechanism.

35. A mechanism for packing cartons with flat articles comprising a carriage adapted to support the carton to be filled, a packing chamber, a packing plunger operating therethrough to feed the articles into the carton, mechanism for automatically delivering the articles to said packing chamber, mechanism for placing an empty carton in said carriage, mechanism for initially moving said carriage with the empty carton to the packing position and for returning said carriage and the filled carton to its discharging position, mechanism for discharging the filled carton, and means for timing the sequence of operation of said mechanism.

36. A mechanism for packing cartons comprising a carriage adapted to support the carton to be filled, a packing chamber, a packer operating therein, means for delivering the articles to be packed in said chamber, mechanism for simultaneously operating said delivering means and said packer, mechanism for delivering an empty carton to said carriage, moving it to its packing position and packing the articles therein, mechanism for returning said carriage and the filled carton after a predetermined interval, and means for temporarily checking the operation of said article delivering and packing mechanism and starting said carriage operating mechanism and operating it while said article delivering and packing mechanism is at rest.

37. In a carton packing machine, a main carriage adapted to support a carton and having a packing and discharging position and an operating mechanism for said carriage, means for packing articles in the carton, an auxiliary carriage having means for holding the articles in the carton while said main carriage is moving to its discharging position, and means for retracting said holding means and returning said auxiliary carriage to the packing position prior to the return movement of said main carriage to said position to permit the placing of an empty carton in said main carriage.

38. In a carton packing machine, a main carriage adapted to support a carton and having a packing and discharging position and an operating mechanism for said carriage, means for packing articles in the carton, an auxiliary carriage having means for holding the articles in the carton while said main carriage is moving to its discharging position, means for retracting said holding means and returning said auxiliary carriage to the packing position prior to the return movement of said main carriage to said position, and means for delivering an empty carton to said main carriage before its initial movement to said packing position.

39. A mechanism for packing flat articles in a carton transversely thereof comprising a carriage for moving and for supporting the carton in a packing position, means for packing the articles in a transverse position in the carton, means for moving said carriage and carton to the carton discharging position when the packing is completed, said carriage including carton supporting shelves and means for moving them to release the carton, and mechanism for discharging the filled carton between said shelves.

40. A mechanism for packing flat articles in a carton transversely thereof comprising a carriage for moving and for supporting the carton in a packing position, means for packing the articles in a transverse position in the carton, means for moving said carriage and carton to a discharging position when the packing is completed, said carriage having movable carton supports and mechanism for separating said supports to discharge the filled carton between them.

41. In a carton packing machine, a carriage adapted to support a carton and having a packing and a discharging position and an operating mechanism for said carriage, means for packing articles in the carton, means for moving said carriage and carton from its packing to its discharging position and means for discharging the filled carton through the bottom of said carriage.

42. In a carton packing machine, a carriage adapted to support a carton and having a packing and a discharging position and an operating mechanism for said carriage, means for packing articles in the carton, bottom supports for the carton, means for withdrawing said bottom supports when said carriage is in its discharging position, and a plunger device operating to engage and to discharge the filled carton through the bottom of said carriage.

43. A mechanism for packing cartons with flat articles comprising a carriage adapted to support the carton to be packed, a packing chamber opposite which the empty carton is supported, means for moving the carriage to its packing position, means for packing the articles in the carton, means in connection with the carriage for gripping the carton to hold it in place during the packing operation, a main driving shaft, mechanism connecting said shaft with said packing means, said carriage moving means and said carton gripping means, and means for timing the sequence of operation and the duration of movement of said mechanism.

44. A mechanism for packing cartons with flat articles comprising a carriage adapted to support the carton to be packed, a packing chamber opposite which the empty carton is supported, means for packing the articles in the carton, means mounted on said carriage against which one end of the carton is seated during the packing operation, means for gripping the side walls of the carton during the packing operation, means for moving the carriage and carton to the packing position and means for operating said carriage, said packing means and said carton gripping means synchronously.

In witness whereof I have hereunto set my hand this 11th day of January, 1919.

ARTHUR W. HARRIS.